United States Patent [19]

Kasori et al.

[11] Patent Number: 4,746,637
[45] Date of Patent: May 24, 1988

[54] ALUMINUM NITRIDE SINTERED BODY AND PROCESS FOR PRODUCING THE SAME

[75] Inventors: Mituo Kasori, Kawasaki; Kazuo Shinozaki; Kazuo Anzai, both of Tokyo; Akihiko Tsuge, Yokohama, all of Japan

[73] Assignee: Kabushiki Kaisha Toshiba, Japan

[21] Appl. No.: 760,772

[22] Filed: Jul. 31, 1985

[30] Foreign Application Priority Data

Nov. 8, 1984 [JP] Japan ................................ 59-234093
Mar. 13, 1985 [JP] Japan .................................. 60-48257

[51] Int. Cl.$^4$ ............................................ C04B 35/58
[52] U.S. Cl. ...................................... 501/98; 501/96; 501/125; 501/151
[58] Field of Search ..................... 501/98, 96, 125, 151

[56] References Cited

U.S. PATENT DOCUMENTS

| | | | |
|---|---|---|---|
| 3,238,018 | 3/1966 | Winter et al. | 501/98 |
| 3,531,245 | 9/1970 | Dietz | 501/98 |
| 3,930,875 | 1/1976 | Ochiai et al. | 501/98 |
| 4,435,513 | 3/1984 | Komeya et al. | 501/98 |
| 4,540,673 | 9/1985 | Takeda et al. | 501/98 |
| 4,547,471 | 10/1985 | Huseby et al. | 501/98 |
| 4,591,537 | 5/1986 | Aldinger et al. | 501/96 |

FOREIGN PATENT DOCUMENTS

| | | | |
|---|---|---|---|
| 0147101 | 7/1985 | European Pat. Off. | 501/98 |
| 0166073 | 1/1986 | European Pat. Off. | 501/96 |
| 3247985 | 7/1984 | Fed. Rep. of Germany. | |
| 3313836 | 10/1984 | Fed. Rep. of Germany. | |
| 47-18655 | 5/1972 | Japan. | |
| 59-50077 | 3/1984 | Japan | 501/96 |
| 978734 | 12/1964 | United Kingdom. | |

OTHER PUBLICATIONS

Gauthier, G. et al., "Influence of Very Low Additions of Cao and $Y_2O_3$ on the Densification of Aluminum Nitride by Hot-Pressing Between 1650° C. and 1750° C." C. R. Acad. Sc., Paris, t. 301, Serie II, No. 3, 1985, pp. 135–138 (7 page Eng transln).
Shinozaki, T. et al. "Sintering Characteristics and Thermal Conductivity of $Y_2O_3$-Added AlN Sintered Under Normal Pressure"—22nd Symposium on Basic Science of Ceramics, Yogyo-Kyokai, Jan. 1984, p. 43 (2 page Eng translation).
Advanced Optical Ceramics, Phase III, Final Report, DIN:82 SDR 20006, Feb. 1982, pp. 4–76 to 4–80, pp. 4–127 to 4–137.
Schwetz, K. A. et al. "Sintering of Aluminum Nitride with Low Oxide Addition, " Progress in Nitrogen Ceramics (1983) pp. 245–252.
Komeya, K. et al. "The Influence of Fibrous Aluminum Nitride on the Strength of Sintered $AlN-Y_2O_3$", Trans & J. Brit Ceram-Soc. 70(3) 1971 pp. 107–113.
Komeya, K. et al. "Effect of Various Additives on Sintering of Aluminum Nitride", Eng. Transln of Yogyo-Kyokai-Shi 89(6) 1981, pp. 330–336.
Sakai, T. et al.–"Effect of the Oxygen Impurity on the Sintering and the Thermal Conductivity of AlN Poly- (List continued on next page.)

Primary Examiner—Mark L. Bell
Assistant Examiner—Karl Group
Attorney, Agent, or Firm—Schwartz Jeffery Schwaab Mack Blumenthal & Evans

[57] ABSTRACT

Disclosed are an aluminum nitride sintered body comprising aluminum nitride, rare earth element-aluminum compounds and alkaline earth metal-aluminum compounds, and a process for producing an aluminum nitride sintered body, which comprises adding to aluminum nitride powder:

(a) powder of at least one compound selected from the group consisting of rare earth element oxides, rare earth element fluorides and compounds capable of being converted into these oxides or fluorides by calcination, and (b) powder of at least one compound selected from the group consisting of alkaline earth metal oxides, alkali earth metal fluorides and compounds capable of being converted into these oxides or fluorides by calcination, in a total amount of 0.01 to 20 wt % as calculated on the weight of the oxides or the fluorides, and then molding and sintering the resultant mixture.

13 Claims, 3 Drawing Sheets

OTHER PUBLICATIONS crystal J. Cer. Soc. of Japan, 86 (1978) pp. 174–179.

McCauley, T. W. et al–High Temperature Reactions and Microstructures in $Al_2O_3$–AlN System–Progress in Nitrogen Ceramics 1983–pp. 111–118.

Komeya, K. et al. Journal of the American Ceramic Society–Discussions and Notes, Sep. 1974, pp. 411–412, "Role of $Y_2O_3$ and $SiO_2$ Additions in Sintering of AlN.

Kuramoto, N. et al. Journal of Materials Science Letters 3 (1984) 471–474, "Transparent AlN Ceramics".

ALUMINUM NITRIDE SINTERED BODY AND PROCESS FOR PRODUCING THE SAME

BACKGROUND OF THE INVENTION

This invention relates to an aluminum nitride sintered body and a process for producing the same. More particularly, it relates to an aluminum nitride sintered body having high density and high thermal conductivity, and to a process capable of producing the same at low temperature.

Aluminum nitride (AlN) has high strength at temperatures from room temperature to higher temperatures and is also excellent in chemical durability. Therefore, while it has been utilized as heat-resistant materials, application of aluminum nitride for heat dissipating plate material through utilization of its high thermal conductivity and high electrical insulation is expected to be promising. Such AlN has generally no melting point but will be decomposed at a high temperature of 2789 K. or higher and it is used as a sintered body except for cases where it is used as thin films or the like.

Such an aluminum sintered body is generally obtained by molding and sintering AlN powder. However, when AlN powder alone is used, it cannot be sintered well and therefore it is difficult to obtain a high density sintered body when sintering is conducted by a method other than the hot press method.

Accordingly, when sintered under atmospheric conditions, with an aim to promote the densification of the sintered body, it is generally practiced to add a rare earth element oxide or an alkaline earth metal oxide as the sintering aid to AlN powder. See "Effects of various kinds of additives on sintering of aluminum nitride:, K. Komeya, H. Inoue and A. Tsuge, Yogyo-Kyokai-shi 89 (6) 1981.

By addition of such a sintering aid, the density of the sintered body has indeed considerably been enhanced. However, on the other hand, thermal conductivity of such a sintered body, due to presence of oxygen and other impurities and grain boundaries, remains lower than expected under the pressure situation. More specifically, while the theoretical thermal conductivity is 320 W/m·k, that of an AlN sintered body is in the range of 20 to 60 W/m·k.

Further, the temperature at which ordinary AlN powder is sintered is usually very high as 1800° C. or higher, which has been a bar to reduction in cost for production of AlN sintered body.

SUMMARY OF THE INVENTION

An object of this invention is to resolve the problems of the prior art as described above and to provide an AlN sintered body having a high density and a high thermal conductivity as well and also a process capable of producing it by sintering at a relatively low temperature.

The present inventors have made extensive studies about the sintering aids to be added to the AlN powder with relation to the density and the thermal conductivity of the sintered body obtained therefrom, and as a result, have found a fact described below. Namely, although either a rare earth element oxide or an alkaline earth metal oxide has been heretofore used alone as the sintering aid, the use of at least one compound selected from the group consisting of rare earth element oxides and rare earth element fluorides in combination with at least one compound selected from the group consisting of alkaline earth metal oxides and alkaline earth metal fluorides affords an AlN sintered body having a high density as well as a high thermal conductivity at a lower sintering temperature as compared with the cases where either a rare earth element oxide or an alkaline earth metal oxide is used alone.

Specifically, the aluminum nitride sintered body of this invention comprises aluminum nitride, rare earth element-aluminum compounds and alkaline earth metal-aluminum compounds, and the process for production thereof comprises adding to aluminum nitride powder:

(a) powder of at least one compound selected from the group consisting of rare earth element oxides, rare earth element fluorides, compounds capable of being converted into these oxides or fluorides by calcination, and (b) powder of at least one compound selected from the group consisting of alkaline earth metal oxides, alkaline earth metal fluorides, compounds capable of being converted into these oxides or fluorides by calcination in a total amount of 0.01 to 20 wt % as calculated in terms of the weight of oxides or the fluorides, and then molding and sintering the resultant mixture.

DESCRIPTION OF THE PREFERRED EMBODIMENTS

Figure 1:
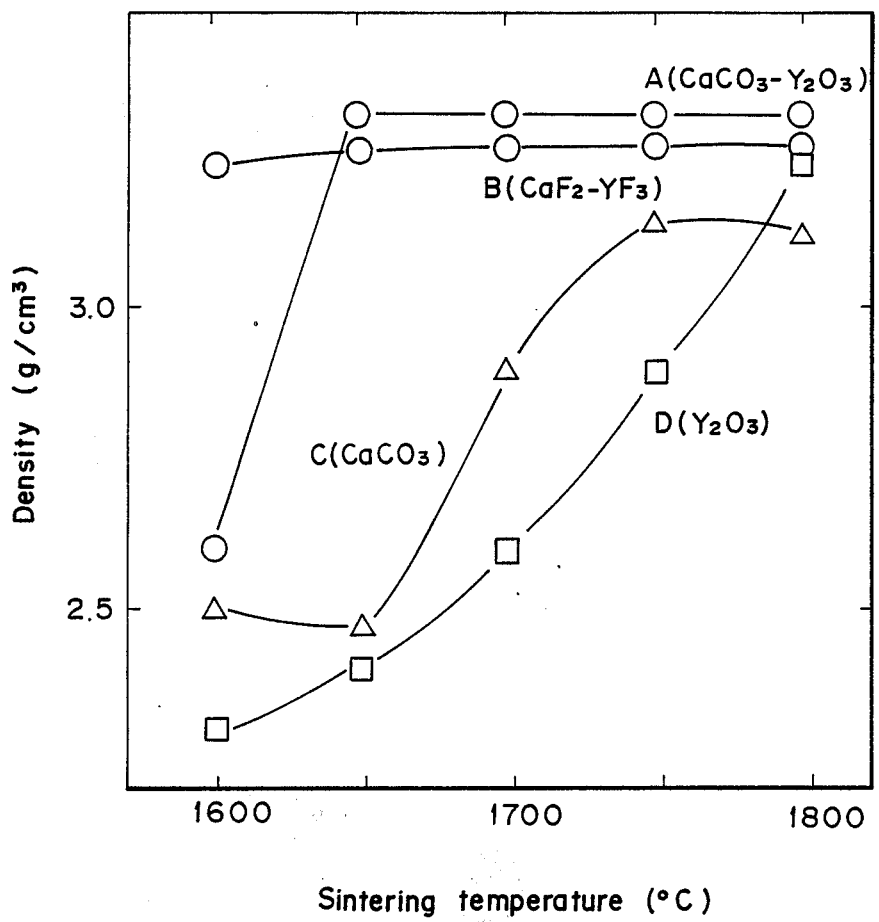
FIG. 1 is a graph showing the relationship between the sintering temperature and the density of the AlN sintered body obtained according to the present invention.

The AlN sintered body of the present invention, when its constituent phases are observed by X-ray diffraction, is found to have, in addition to the AlN, rare earth element-aluminum oxides and alkaline earth metal-aluminum oxides, both being identified therein, in cases where both the rare earth element compounds and the alkaline earth metal compounds are oxides. When the rare earth element is, for example, yttrium (Y), rare earth-aluminum oxides as mentioned above may be compounds such as $3Y_2O_3.5Al_2O_3$, $Y_2O_3.Al_2O_3$ and the like. On the other hand, when the alkaline earth metal element is, for example, calcium (Ca), the alkaline earth-aluminum oxides may be compounds such as $CaO.6Al_2O_3$, $CaO.2Al_2O_3$, $CaO.Al_2O_3$ and the like.

In cases where either the rare earth element compound or the alkaline earth metal compound is a fluoride, the AlN sintered body of the present invention, when its constituent phases are observed by X-ray diffraction, is identified to have, in addition to the AlN, rare earth element-aluminum oxides and compounds similar thereto, and alkaline earth metal-aluminum oxides and compounds similar thereto, all being formed therein. Although in some exceptional cases AlON (an oxy-nitride of Al) or polymorphism, mainly 27R type, of the AlN is sometimes found to be formed. When the rare earth element is, for example, yttrium (Y) and this yttrium compound is an oxide, $3Y_2O_3 \cdot 5Al_2O_3$, $Y_2O_3 \cdot Al_2O_3$ or other oxides are identified to be formed. On the other hand, when the rare earth element is yttrium (Y) and this yttrium compound is a fluoride ($YF_3$), $3Y_2O_3 \cdot 5Al_2O_3$, $Y_2O_3 \cdot Al_2O_3$ or compounds similar thereto are identified to be formed.

Moreover, when the alkaline earth metal element is calcium (Ca) and this calcium compound is an oxide (CaO), $6Al_2O_3 \cdot CaO$, $2Al_2O_3 \cdot CaO$ or other alkaline earth metal-aluminum oxides are identified to be formed. On the other hand, when the above calcium compound is a fluoride, ($CaF_2$), $6Al_2O_3 \cdot CaO$, $2Al_2O_3 \cdot CaO$ or compounds similar thereto are found to be formed. However, compounds composed of the rare earth element and the alkaline earth metal element or compounds composed of the rare earth element, the alkaline earth metal element and as well aluminum are not identified.

In the above AlN sintered body, the composition ratio of AlN should preferably be 80 to 99.99 wt % based on the total weight.

Meanwhile, each phase of the similar compounds which is formed when the fluoride is added is supposed to be an oxy-fluoride compound.

The process for producing AlN sintered body of the present invention is particularly useful when applied for AlN powder containing 0.001 to 7 wt % of oxygen.

The particle sizes of the AlN powder and the sintering aid powder to be employed may be both 5 $\mu$m or less on average, preferably 4 $\mu$m or less. The rare earth element to be added as the sintering aid may include Y, La, Ce, Sm, Dy, Nd, Gd, Pr, Ho, Er and Yb, particularly preferably Y, La and Ce. These rare earth elements are added either singly or in combination of two or more kinds in the form of powder of oxides or fluorides, or in the form of powder of compounds capable of being converted into oxides or fluorides by calcination to the above AlN powder. As the compounds capable of being converted into oxides by calcination, there may be employed carbonates, nitrates, oxalates, etc. of these elements. As the compounds capable of being converted into fluorides by calcination, there may be employed hydrogenfluorides, etc.

The alkaline earth metal may include Mg, Ca, Sr and Ba, particularly preferably Ca, Sr and Ba. These alkaline earth metals are also added to AlN poder similarly as described above either singly or in combination of two or more kinds in the form of powder of oxides or fluorides or in the form of powder of compounds capable of being converted into oxides by calcination. As the compounds capable of being converted into oxides by calcination, there may be employed carbonates, nitrates, oxalates, hydroxides of these metals or hydrates thereof. As the compounds capable of being converted into fluorides by calcination, there may be employed hydrogenfluorides, etc.

The above rare earth element compound powder and the alkaline earth metal compound powder may be added at a proportion of 0.01 to 20 wt % as the total amount, each being calculated in terms of the weight of oxides or fluorides. If the total amount added is less than 0.01 wt %, there is a possibility that no desired effect can be obtained. On the other hand, if it exceeds 20% by weight, there is a possibility that not only heat resistance and mechanical strength are impaired, but also thermal conductivity will be lowered. The total amount added may preferably be 0.01 to 17 wt %.

Moreover, the present inventors have made extensive studies on a formulation ratio of the above alkaline earth metal compound to the above rare earth element compound, and as a result, have found that the formulation ratio has an effect on the density or the thermal conductivity of the sintered body obtained.

The formulation ratio of the alkaline earth metal compound to the rare earth element compound typically ranges from 0.1:9.9 to 9.9:0.1%, and preferably from 1:9 to 9:1.

While most of the reasons for the increased thermal conductivity of the sintered body of the present invention and for the lowered sintering temperature have not yet been clarified, the following reasoning may be made for one of the above reasons. Namely, there may be mentioned as one of the causes for increasing the thermal conductivity that in the present sintered body spinel type compounds formed by the reaction of AlN with impurity oxygen, i.e., $(AlN)_x(Al_2O_3)_y$ (x and y each represents a natural number), oxy-nitriles (AlON) and polytype of AlN (27R type) can be hardly generated.

According to the studies by the present inventors, it has been found that every sintered body in which AlON or 27R type of ALN has been formed exhibits lower thermal conductivity. The formation of AlON or the 27R type polytype is influenced by the purity of AlN powder, atmosphere in a sintering furnace, kind and amount of the sintering aids to be added. However, when comparison is made between the sintered bodies produced by using the same AlN powder under the same experimental conditions, the sintered body according to the present invention contains distinctively smaller amount of formed AlON or 27R type polytype as compared with the conventional sintered bodies containing an alkaline earth metal oxide or a rare earth element oxide, or otherwise contains neither AlON nor 27R type polytype at all.

On the other hand, as the result of examination of the constituent phases of the sintered body, when an aid containing $CaCO_3$ alone is used, compounds such as AlON, 27R type polytype, $CaO \cdot 6Al_2O_3$, $CaO \cdot 2Al_2O_3$, $CaO \cdot Al_2O_3$, etc., in addition to the AlN phase, are found to be formed depending on the amount of $CaCO_3$ added. Similarly, when $Y_2O_3$ is employed as the aid, compounds such as AlON, 27R type polytype, $3Y_2O_3 \cdot 5Al_2O_3$, $Y_2O_3 \cdot Al_2O_3$, etc. are found to be formed depending on the amount of the aid added. Whereas, also in the case of an aid comprising $CaCO_3$ and $Y_2O_3$, in the constituent phases of the sintered body, only compounds of CaO and $Al_2O_3$ and compounds of $Y_2O_3$ and $Al_2O_3$ are found to be formed without formation of compounds of CaO and $Y_2O_3$. However, in view of the fact that the sintering temperature for each case is respectively lower than that for the case where $CaCO_3$ or $Y_2O_3$ is used alone, it may be considered that some interaction between the rare earth element compound and the alkaline earth metal compound, or between these aids and AlN or impurity contained in the AlN has occurred to generate a liquid phase at a lower temperature and thereby to promote sintering of AlN.

Next, an example of the method for production of the AlN sintered body of the present invention is to be described below.

First, to the AlN powder are added the powder comprising the rare earth element compound and the alkaline earth metal compound as described above as the sintering aid in predetermined amounts, followed by mixing by means of a ball mill, etc. For sintering, the atmospheric sintering method, the hot press sintering method and other methods may be available. In the case of the atmospheric sintering method, a binder is added to the mixed powder and, molded after kneading, granulation and granule selection. As the molding method, mold press molding, static hydraulic press molding or sheet molding may be appliable. Subsequently, the molded product is heated in, for example, $N_2$ gas stream to remove the binder, and then subjected to atmospheric sintering.

On the other hand, in the case of the hot press sintering method, the starting materials mixed by a ball mill, etc. may be directly subjected to hot press.

In such steps, in either the case by the atmospheric sintering method or the case by the hot press sintering method, the sintering temperature may be 1700° C. or lower, practically 1600° to 1700° C.

Examples of the invention

EXAMPLE 1

To an AlN powder containing 3.6 wt % of oxygen and having an average particle size of 2.2 μm was added 3 wt % of the powder mixture of $CaCO_3$ and $Y_2O_3$ (weight ratio 3:2) having an average particle size of 2.5 μm, and pulverization and mixing were conducted by means of a ball mill to prepare a starting material. Then, 7 wt % of paraffin was added to the starting material, and the mixture was granulated and the press molded under a pressure of 300 kg/cm² into pressed powder of 30×30×8 mm. The pressed powder was heated in nitrogen atmosphere up to 700° C. to remove paraffin. Further, it was placed in a carbon mold and sintered in nitrogen atmosphere at 1700° C. under atmospheric pressure for 2 hours. The density of the AlN sintered body obtained was measured. Also, a disc of 10 mm in diameter and 3.5 mm in thickness was cut out from the sintered body and, using this as the test strip, the thermal conductivity was measured according to the laser flash method. The results are shown in Table 1.

EXAMPLES 2-10

By use of various kinds of AlN powder and various kinds of sintering aid powder, following otherwise the same procedure as in Example 1, AlN sintered bodies were prepared, and the density and the thermal conductivity were measured for each of them. The results are shown in table 1 together with the particle sizes of and oxygen contents in the respective AlN powders, the kinds of sintering aids, their formulation ratios, particle sizes and amounts added.

COMPARATIVE EXAMPLE 1

An AlN sintered body was produced in the same manner as in Example 1 from only the AlN powder as used in Example 1.

COMPARATIVE EXAMPLE 2

An AlN sintered body was prepared in the same manner as in Example 1 by adding 3 wt % of $CaCO_3$ powder with an average particle size of 2.4 μm to the AlN powder as employed in Example 1.

COMPARATIVE EXAMPLE 3

An AlN sintered body was prepared in the same manner as in Example 1 by adding 3 wt % of $Y_2O_3$ powder with an average particle size of 2.5 μm to the AlN powder as employed in example 1.

For each of the AlN sintered bodies obtained in these Comparative examples 1-3, the density and the thermal conductivity were measured similarly as in Example 1. The results are also shown in Table 1.

EXAMPLE 21

To the AlN powder as employed in Example 1, 4 wt % of the powder mixture of $BaCO_3$ with an average particle size of 1.5 μm and $La_2O_3$ with a particle size of 2.5 μm (weight ratio=1:1) was added, followed by pulverizing and mixing by means of a ball mill, to prepare a starting material. Then, the starting material powder was press molded under a pressure of 300 kg/cm2 into the pressed powder of 12 mm in diameter and 10 mm in thickness. Thereafter, the pressed powder was placed in a carbon mold and subjected to hot press sintering in nitrogen gas atmosphere at 1700° C. under a pressure of 400 kg/cm² for one hour. The density and the thermal conductivity of the AlN sintered body obtained were measured similarly as in Example 1 to obtain the results as shown in Table 2.

TABLE 1

| | AlN powder | | Compound powder added (wt %) | | | | |
|---|---|---|---|---|---|---|---|
| | Average particle size (μm) | Oxygen content (wt %) | Composition (weight ratio) | Averge particle size (μm) | Amount added (wt %) | Density (g/cm³) | Themal conductivity (W/m · K) |
| Example 1 | 2.2 | 3.6 | $CaCO_3:Y_2O_3 =$ 3:2 | 2.5 | 3 | 3.31 | 82 |
| Example 2 | 1.6 | 2.4 | $CaCO_3:La_2O_3 =$ 1:1 | 2.5 | 5 | 3.32 | 81 |
| Example 3 | 4.8 | 3.5 | $CaCO_3:BaCO_3:$ $Y_2O_3 = 1:1:2$ | 0.8-2.5 | 6 | 3.33 | 79 |
| Example 4 | 2.3 | 1.3 | $SrCO_3:Nd_2O_3 =$ 1:1 | 1.2-1.5 | 10 | 3.35 | 98 |
| Example 5 | 1.6 | 2.4 | $BaCO_3:La_2O_3:$ $CeO_2 = 1:1:1$ | 1.0-4.0 | 3 | 3.31 | 84 |
| Example 6 | 0.5 | 0.9 | $CaCO_3:Y_2O_3 =$ 1:1 | 0.8-2.5 | 5 | 3.32 | 110 |
| Example 7 | 1.6 | 2.4 | $BaCO_3:CaCO_3:$ $Dy_2O_3:Sm_2O_3 =$ 1:1:1:1 | 1.5-2.5 | 5 | 3.31 | 86 |
| Example 8 | 1.2 | 1.4 | $CaC_2O_4.H_2O:$ $Ce(C_2O_4).9H_2O =$ 1:2 | 2.0-2.5 | 19 | 3.35 | 90 |
| Example 9 | 1.2 | 1.4 | $CaC_2O_4.H_2O:$ $Y_2O_3 = 3:1$ | 0.8-2.0 | 12 | 3.36 | 105 |
| Example 10 | 1.2 | 1.4 | $CaCO_3:Y_2O_3 =$ 2:1 | 0.8-2.5 | 0.5 | 3.30 | 102 |

TABLE 1-continued

| | AlN powder | | Compound powder added (wt %) | | | | |
|---|---|---|---|---|---|---|---|
| | Average particle size (μm) | Oxygen content (wt %) | Composition (weight ratio) | Averge particle size (μm) | Amount added (wt %) | Density (g/cm³) | Thermal conductivity (W/m · K) |
| Example 11 | 2.2 | 3.6 | $CaF_2:YF_3 = 1:3$ | 1.5 | 4 | 3.31 | 79 |
| Example 12 | 0.5 | 0.9 | $CaF_2:YF_3: LaF_3 = 1:2:2$ | 1.0–1.5 | 5 | 3.32 | 130 |
| Example 13 | 1.6 | 2.4 | $BaF_2:CeO_2 = 1:1$ | 1.0–1.5 | 7 | 3.33 | 92 |
| Example 14 | 1.2 | 1.4 | $SrF_2:YF_3 = 1:2$ | 1.0–1.5 | 1 | 3.30 | 89 |
| Example 15 | " | " | $CaO:YF_3 = 1:3$ | 1.5 | 3 | 3.31 | 95 |
| Example 16 | " | " | $SrF_2:NdF_3 = 1:1$ | 1.0–1.5 | 8 | 3.32 | 110 |
| Example 17 | 1.6 | 2.4 | $CaF_2:BaF_2: DyF_3:Sm_2O_3 = 1:1:1:1$ | 1.0–1.5 | 0.5 | 3.29 | 86 |
| Example 18 | " | " | $CaF_2:BaF_2: YF_3 = 1:1:2$ | 1.0–1.5 | 15 | 3.33 | 115 |
| Example 19 | 2.2 | 3.6 | $BaF_2:LaF_3: CeO_2 = 1:2:2$ | 1.0–1.5 | 10 | 3.32 | 90 |
| Example 20 | " | " | $YF_3:CaO: BaF_2 = 5:1:1$ | 1.0–1.5 | 2 | 3.31 | 78 |
| Comparative Example 1 | 2.2 | 3.6 | — | — | — | 2.12 | 8 |
| Comparative Example 2 | " | " | $CaCO_3$ | 2.4 | 3 | 2.78 | 26 |
| Comparative Example 3 | " | " | $Y_2O_3$ | 2.5 | 3 | 2.64 | 20 |

EXAMPLE 22

Following the same procedure as in Example 21 except that the powder mixture of $BaF_2$ with an average particle size of 1.5 μm and $LaF_3$ with an average particle size of 2.5 μm (weight ratio=1:1) were used, sintering products were produced and the density and the thermal conductivity were measured. The results are also shown in Table 2.

COMPARATIVE EXAMPLE 4

From only the AlN powder as employed in Example 1, an AlN sintered body was prepared in the same manner as in Example 21.

COMPARATIVE EXAMPLE 5

To the AlN powder as employed in Example 1 was added 4 wt % of $BaCO_3$ with an average particle size of 1.5 μm, and the mixture was processed in the same manner as in Example 21 to prepare an AlN sintered body.

COMPARATIVE EXAMPLE 6

To the AlN powder as employed in Example 1 was added 4 wt % of $La_2O_3$ with an average particle size of 2.5 μm, and the mixture was processed in the same manner as in Example 21 to prepre an AlN sintered body.

For each of the AlN sintered bodies obtained in these Comparative examples 4–6, the density and the thermal conductivity were measured similarly as in Example 1. The results are also shown in Table 2.

TABLE 2

| | AlN powder | | Compound powder added (wt %) | | | | |
|---|---|---|---|---|---|---|---|
| | Average particle size (μm) | Oxygen content (wt %) | Composition (weight ratio) | Average particle size (μm) | Amount added (wt %) | Density (g/cm³) | Thermal conductivity (W/m · K) |
| Example 21 | 2.2 | 3.6 | $BaCO_3:La_2O_3 = 2:2$ | 1.5–2.5 | 4 | 3.31 | 83 |
| Example 22 | 2.2 | 3.6 | $BaF_2:LaF_3 = 1:1$ | — | 4 | 3.31 | 80 |
| Comparative example 4 | 2.2 | 3.6 | — | — | — | 3.30 | 29 |
| Comparative example 5 | 2.2 | 3.6 | $BaCO_3$ | 2.1 | 4 | 3.31 | 35 |
| Comparative example 6 | 2.2 | 3.6 | $La_2O_3$ | 2.3 | 4 | 3.32 | 38 |

EXAMPLE 23

Next, to an AlN powder containing 1.4 wt % of oxygen and having an average particle size of 1.2 μm, 2.8 wt % of the powder mixture of $CaCO_3$ with an average particle size of 2.5 μm and $Y_2O_3$ with an average particle size of 0.8 μm (weight ratio: 1:1) or 2.8 wt % of the powder mixture of $CaF_2$ with an average particle size of 2.5 μm and $YF_3$ with an average particle size of 0.8 μm (weight ratio: 1:1) were added, and the mixture was subjected to sintering according to the same procedure as in Example 1 at respective temperatures of 1600° C., 1650° C., 1700° C., 1750° C. and 1800° C. for 2 hours. For each of the AlN sintered bodies obtained, the density and the thermal conductivity were measured similarly as in Example 1, and the results obtained are shown on Curve A (CaCO$_3$-Y$_2$O$_3$) and Curve B (CaF$_2$-YF$_3$) in FIG. 1 and FIG. 2, respectively.

Figure 2:
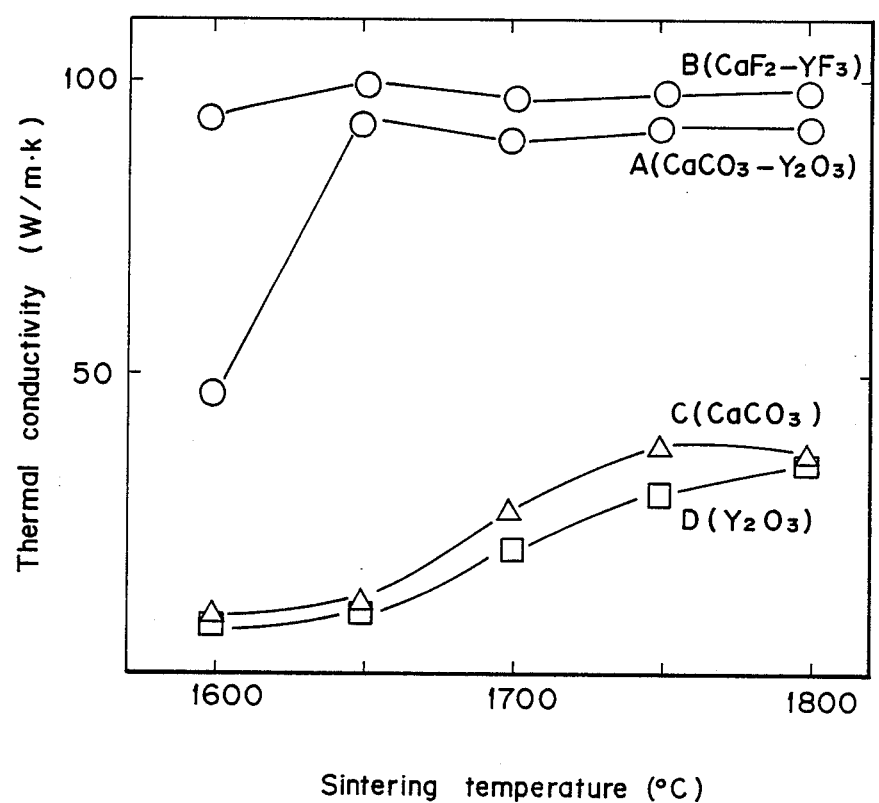
FIG. 2 is a graph showing the relationship between the sintering temperature and the thermal conductivity of the AlN sintered body obtained according to the present invention.

For comparison, by use of the starting powder in which 5 wt % of CaCO$_3$ (2.8 wt % as calculated on CaO) with an average particle size of 2.5 μm was added to the same AlN powder and the starting powder in which 2.8 wt % of Y$_2$O$_3$ with an average particle size of 0.8 μm, sintering was conducted at the same respective tempratures as mentioned above, and the results of measurement of the density and the thermal conductivity of each sentered product obtained are shown on Curve C (only CaCO$_3$) and Curve D (only Y$_2$O$_3$) in FIG. 1 and FIG. 2, respectively.

As apparently seen also from FIG. 1 and FIG. 2, in the AlN sintered body of the present invention, the sintering temperature can be drastically lowered and also a high density and a high conductivity can be obtained, and hence it is possible to suppress the production cost at a lower level as compared with the AlN sintered body of the prior art.

EXAMPLE 24

To an AlN powder containing 3.6 wt % of oxygen and having an average particle size of 2.2 μm was added 3.0 wt % of a mixed powder of CaCO$_3$ with an average particle size of 2.5 μm and Y$_2$O$_3$ with an average particle size of 0.8 μm at a weight ratio of 3:1, 1:1 or 1:3, and the respective resulting mixture was sintered at 1700° C. for 2 hours in the same manner as in Example 1.

Figure 3:
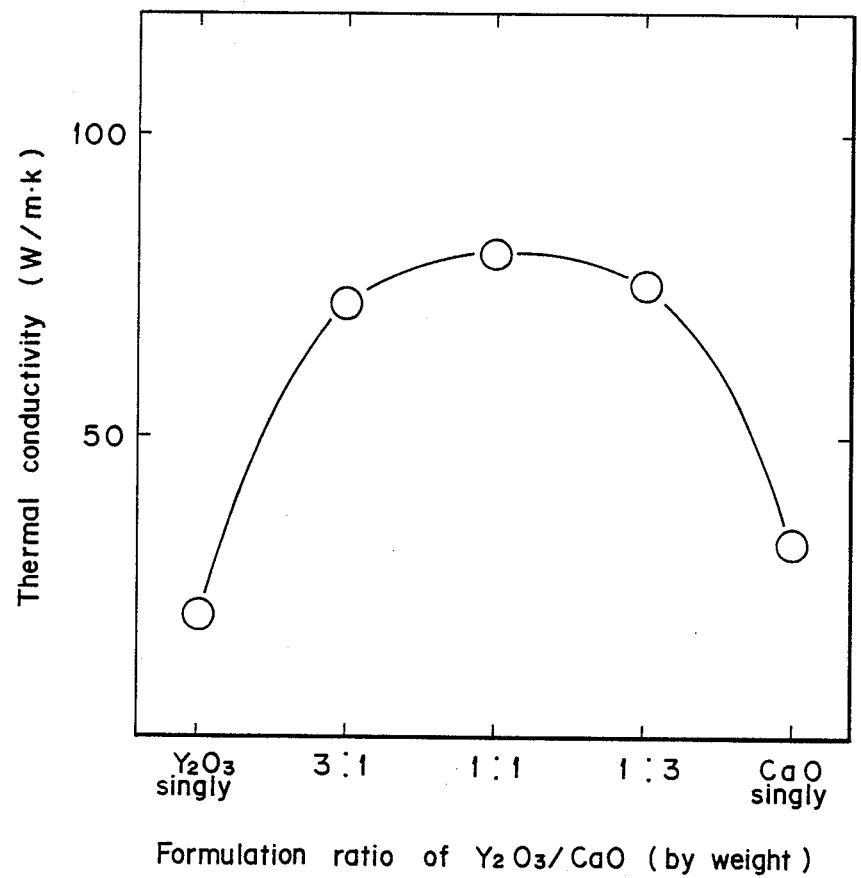
FIG. 3 is a graph showing the relationship between a formulation ratio of the alkaline earth metal compound to the rare earth element compound to be used in the present invention, and the thermal conductivity of the sintered bodies obtained.

For each of the AlN sintered bodies obtained, the thermal conductivity were measured as in Example 1. The results are shown in FIG. 3.

COMPARATIVE EXAMPLE 7

To an AlN powder containing 3.6 wt % of oxygen and having an average particle size of 2.2 μm, was added alone 5.36 wt % of CaCO$_3$ (3.0 wt % as calculated on CaO) with an average particle size of 2.5 μm or 3.0 wt % of Y$_2$O$_3$ with an average particle size of 0.8 μm, and the respective resulting mixture was sintered at 1700° C. for 2 hours.

For each of the AlN sintered bodies obtained the thermal conductivity were measured as in Example 24. The results obtained are also shown in FIG. 3.

Also, in the present invention, in addition to those as mentioned above, other sintering aids such as carbon or NiO may be added.

As can clearly be seen from the above description, the AlN sintered body of the present invention has a high density and also a high thermal conductivity. Also, in its production process, the sintering temperature is 1700° C. or lower, which is lower than that in the prior art, and therefore its commercial value is very great, particularly useful as heat radiating plates in semiconductor devices.

We claim:

1. An aluminum nitride sintered body comprising aluminum nitride, at least one rare earth element-aluminum compound and at least one alkaline earth metal-aluminum compound selected from the group consisting of a calcium-aluminum compound, a strontium-aluminum compound and a barium-aluminum compound, wherein (i) the weight ratio of said alkaline earth metal-aluminum compound to said rare earth element-aluminum compound ranges from about 1:9 to 9:1 and (ii) the total amount of said rare earth element-aluminum compound and said alkaline earth metal-aluminum compound ranges between 0.01 and 20% by weight.

2. The aluminum nitride sintered body according to claim 1, wherein the content of aluminum nitride is 80 to 99.99 wt %.

3. The aluminum nitride sintered body according to claim 1, wherein the ratio of said alkaline earth metal-aluminum compound to said rare earth-aluminum compound ranges from 1:3 to 3:1.

4. The aluminum nitride sintered body according to claim 1, wherein said rare earth element compound is a yttrium-aluminum compound and said alkaline earth metal-aluminum compound is a calcium-aluminum compound.

5. The aluminum nitride sintered body according to claim 1, wherein said sintered body contains a smaller amount of AlON or 27R polytype AlN than another sintered body identically prepared except for using an alkaline earth metal oxide alone or a rare earth element oxide alone in the latter sintered body.

6. The aluminum nitride sintered body according to claim 5, wherein said sintered body is substantially free of AlON and 27R polytype AlN.

7. A process for producing an aluminum nitride sintered body, which comprises the steps of
(1) adding to aluminum nitride powder containing 0.001 to 7 wt % of oxygen:
(a) powder comprising at least one compound selected from the group consisting of a rare earth element oxide, a rare earth element fluoride and a compound capable of being converted into a rare earth element oxide or fluoride by calcination, and
(b) powder comprising at least one compound selected from the group consisting of (i) calcium oxide, strontium oxide, barium oxide, calcium fluoride, strontium fluoride and barium fluoride and (ii) a compound capable of being converted to an oxide or fluoride of (i) by calcination, such that the total amount of said powder (a) and said powder (b) is between 0.01 and 20% by weight, as calculated from the weight of the oxides or the fluorides based on the total amount of the AlN powder, powder (a) and powder (b); and that the weight ratio of said powder (b) to said powder (a) ranges from about 1:9 to 9:1, and then
(2) molding and sintering the resultant mixture by an atmosphere sintering method at a sintering temperature of 1700° C. or lower, wherein said aluminum nitride powder and said powders (a) and (b) have average particle sizes, respectively, of 5 μm or less.

8. The process according to claim 7, wherein the rare earth element in the rare earth element oxides or fluorides is Y, La, Ce, Sm, Dy, Nd, Gd, Pr, Ho, Er or Yb.

9. The process according to claim 8, wherein the rare earth element in the rare earth element oxides or fluorides is Y, La or Ce.

10. The process according to claim 7, wherein the rare earth element oxides or fluorides and the alkaline earth metal oxides or fluorides are added in a total amount of 0.01 to 17 wt %.

11. The process according to claim 7, wherein the ratio of said powder (b) to said powder (a) ranges from 1:3 to 3:1.

12. The process according to claim 7, wherein said powder (a) comprises yttrium oxide and said powder (b) comprises calcium oxide.

13. The process according to claim 7, wherein said powder (a) consists essentially of at least one compound from said group of rare earth element compounds, and said powder (b) consists essentially of at least one compound from said group of oxides and fluorides.

* * * * *